United States Patent [19]
Wilen

[11] Patent Number: 5,816,414
[45] Date of Patent: Oct. 6, 1998

[54] PORTABLE TELEVISION CHANNEL SELECTION STATION

[76] Inventor: Richard Wilen, c/o Premium Channels Publishing, Inc., 135 Oval Dr., Islandia, N.Y. 11722

[21] Appl. No.: 838,404

[22] Filed: Apr. 7, 1997

[51] Int. Cl.[6] .................................................... A47F 7/00
[52] U.S. Cl. ............................................ 211/26.1; 211/10
[58] Field of Search .............................. 211/26.1, 50, 10, 211/54.1, 126.3, 13.1; 206/557

[56] References Cited

U.S. PATENT DOCUMENTS

| | | | |
|---|---|---|---|
| 5,042,670 | 8/1991 | Timberlake | 211/26.1 |
| 5,269,484 | 12/1993 | Jones | 211/26.1 X |
| 5,370,238 | 12/1994 | Czajkowski et al. | 211/13.1 |

*Primary Examiner*—Alvin C. Chin-Shue
*Assistant Examiner*—Sarah Purol
*Attorney, Agent, or Firm*—Stephen E. Feldman

[57] ABSTRACT

The instant invention provides a television channel selection station. The station includes a first rectangular well portion generally contoured for cradling a remote control for a television set. It also includes a second substantially planar rectangular well portion adjacent and contiguous to said first well portion dimensioned for cradling a printed television program schedule guide. Finally, it includes a substantially straight rigid wire member having a two ends, each mounted in an opposing wall of said second substantially planar rectangular well portion, substantially parallel and opposite to the major dimension of said first rectangular well portion, for engaging the folds of said printed television program schedule guide sufficient to substantially fix it to said television channel selection station. The invention also contemplates a process for manufacturing the foregoing station. It includes the steps of compression molding a substantially rectangular, planar sheet of non-virgin plastic to substantially form the station, and mounting a substantially straight rigid wire member in the substantially formed station for engaging the folds of a printed television program schedule guide sufficient to substantially fix it to said article.

9 Claims, 1 Drawing Sheet

PORTABLE TELEVISION CHANNEL SELECTION STATION

BACKGROUND OF THE INVENTION

This invention relates to aids and apparatus for television channel selection and has particular utility for use as an aid to the viewer having a television receiver which has a large number of available television channels.

In its broadest embodiment, the invention contemplates a compact portable station which ensures the proximity of a remote control device (hereinafter "RC") to a television program schedule guide.

Optimum television viewing pleasure requires ready access to at least a television program schedule guide and a remote control device (or "RC"). More often than not, the RC is in one part of the room or house and the television program schedule guide is in another, thus causing inconvenience to the viewer.

In recent years, remote-controllable entertainment and other electronic appliances, such as televisions, video cassette recorders ("VCR's"), audio receivers, etc., have proliferated. Each of these appliances can be controlled (i.e., turned on and off, programmed, tuned, and the like) by a remote-controlled (RC) device, which usually is a small box with an infra-red transmitter inside and various switches on a top surface of it, for controlling the transmitter and causing it to transmit selected codes to the appliance.

The users of such appliances, usually keep their RC units on a low table in front of a sofa, on an arm of a sofa, on a bedside night table, etc. However, as is the usual case, when a user owns several appliances which employ an RC unit, the viewer must store each respective RC unit in a place and manner so as not to cause confusion between it and RC units for other appliances which the viewer might have. Storage of several RC units in any of the aforementioned places, thus presents a problem since the respective, individual RC units tend to become confused among the others and/or lost under other equipment, sofa cushions, books, papers, and the like.

In addition to this problem, users of such RC units typically keep a schedule of entertainment programs and other reference materials, such as television guidebooks, cable guidebooks, satellite television guidebooks, and the like, in proximity to their respective RC units. Thus, the problem presented by the storage and retrieval of these printed materials tends to compound the problem posed by plural RC units.

Various schemes have been proposed by the prior art to ensure certainty in the viewer's capacity to locate a VC when he so desired.

In U.S. Pat. No. 5,485,359 to Galvin, a remote control holder and illumination device, for a remote control having a keypad has a base, an illumination member and a mirror housing adjustment member. The base has a guide passage therein. A fastening member is attached to the upper surface of the base to fasten the base to the remote control. The illumination member has a support frame slidingly attached to the base. A mirror housing is connected to the support frame. A convex mirror is attached to the mirror housing. The mirror may be curved in a convex or concave manner. A mirror housing adjustment member has a guide tab, connected to the support frame, that traverses the guide passage. An actuation member extends through the guide passage to allow the user to adjust the position of the mirror housing along the length of the base.

In U.S. Pat. No. 4,815,683 to Ferrante, a holder for TV/VCR remote control unit is generally rectangular and has one or two remote control unit receiving compartments. Variously shaped spacer brackets can be used to attach the holder to a support surface such as the housing of a TV or VCR. Advantageously, resilient members, such as springs or foam pads are placed into the receiving compartments to selectively elevating the remote control units above the holder to facilitate gripping and provide protection to the units against mechanical shock.

In U.S. Pat. No. 4,848,609 to Meghnot, an adjustable device for holding together any two remote television (TV), stereo and video cassette recorder (VCR) monitor control units. The device consists of two interconnecting pieces having sides with gripping means for firmly holding the monitors in place, bottom portions which interconnect by tongue and groove means and upper portions having matching teeth and grooves for adjustably interconnecting the two pieces to hold any two sizes of controls. The device can be easily held in one hand, thereby leaving the other hand free to operate the TV, stereo and VCR remote control units at the same time. This device prevents remote control units from being misplaced and protects the units from damage due to dropping.

In U.S. Pat. No. 4,893,222 to Mintzer, an illumination device for use with a hand-held remote control unit comprising a base and a projection extending from the base and the projection is exposed to a space formed by the base and contains an illumination source which is directed toward the space. The space is configured to accommodate receipt of at least a portion of the hand-held remote control unit in the space so as to return the hand-held remote control unit in a position to subject a selected surface thereof to the illumination source for facilitating illumination thereof while permitting actuation and operation of the hand-held remote control unit.

In U.S. Pat. No. 4,852,746 to Wells, et al, a remote control unit orientation and storage device (18) includes four wall members (20A, 20B, 20C, and 20D) that define both a plurality of open cells (84A, 84B, 84C, and 84D) for selective engagement of remote control units (81A, 81B, 81C, and 81D) and an internal cell (86) in which accessories (92, 94) are storable. Fastener means (80) provided on wall members forming the cells facilitate secure mounting of remote control units within the cell, and also permit selective removal of remote control units.

In U.S. Pat. No. 4,856,658 to Novak, a holder assembly for remote control units used with television sets, recorders, stereos, home entertainment centers and the like and comprising an adjustably sized control unit holder adapted to be interconnected with other similarly constructed holders.

In U.S. Pat. No. 4,739,897 to Butler, a holder for a remote control unit is provided and consists of a floor panel disposed between and spanning a pair of spaced side panels, a front panel and a rear panel forming therebetween a remote control unit receiving compartment to receive and position the remote control unit. A lower compartment is formed beneath the floor panel so that batteries for the remote control unit can be stored within. A pair of holders can be secured together in a back-to-back relationship for holding two remote control units.

A few prior art references have proposed schemes to ensure the proximity of the viewer's RC and television program schedule guide in one fixed location.

In U.S. Pat. No. 5,127,615 to Jones, a holder for accessories for electronic equipment, such as remote controls (RCs) (30) for televisions, VCRs, audio receivers, etc., and schedule or guidebooks (62) for such equipment comprises a cradle (56) of variable width and length for holding one or more RCs and an underlying holder (34) for the guidebook. The cradle comprises a plurality of L-shaped members (10U, 10L, 80U, 80L) whose long portions (12, 82) overlap to form the bottom of the cradle and are clampable together in a range of positions, e.g., by means of screws (18) or hook-and-loop (H&L) fasteners (22) or double-stick sided tape. The short portions (14, 84) of the L-shaped members stand upright in a spaced relation to form the sides of the cradle. Plural shorter L-shaped members can be used with a provision for adjustable spacing so that the length of the cradle can also be adjusted. The RC units are positioned on the floor of the cradle, side-by-side, and may be held thereto by means of H&L fasteners (24). The underlying guidebook holder may be used alone or it may be attached to the RC-holding cradle by H&L fasteners (32, 54, 79), double-stick-sided tape, or integrally. Additional holders may be stacked below the first one. It comprises a plurality of plates (36, 37, 38) with attached sides so as to form a rectangular cavity. The bottom of the cavity may be closed by end flaps (42, 46, 68) of the plates or by a clamp (70) or a torsion spring. The plates may be hinged and held together by a coil or torsion spring (72) such that they can be opened in clamshell fashion.

In U.S. Pat. No. 4,739,887 to Beach, a rack is specially designed for holding stereo and television remote control devices. The rack includes horizontally adjustable shelves and may further include either a fixed or swivel base. The rack also includes a special holder for a television guide book or the like.

In addition to the problems cited above, none of the prior art schemes provides any means by which the proximity of a given RC devise to a given program schedule guide may be ensured.

SUMMARY OF THE INVENTION

The instant invention in large part solves the problems of the prior art and fulfills a long felt need by providing a novel and improved compact portable station which ensures the proximity of at least one remote control device (hereinafter "RC") to at least one program schedule guide.

The instant invention provides a television channel selection station which includes rectangular well portions respectively generally contoured for cradling both a remote control for a television set and a printed television program schedule guide. The television channel selection station of the instant invention also includes a substantially straight rigid wire member for engaging the folds of the printed television program schedule guide sufficient to substantially fix it to the television channel selection station without assist by any other means.

Also contemplated by the invention is a process for manufacturing the television channel selection station. This method includes the steps of press molding a substantially rectangular, planar sheet of, preferably, non-virgin plastic, to substantially form the station. The method further includes the step of mounting straight rigid wire member in the substantially formed station, positioned for engaging the folds of a printed television program schedule guide sufficient to substantially fix it to the article, with assist from no other means.

The more important features of the invention have been broadly outlined above, in order that the detailed description that follows may be better understood; and in order for the present contribution to the art may be better appreciated. There are additional features of the invention that will be described hereinafter and which form the subject matter of the appended claims. Those of ordinary skill in the art will appreciate that the conception upon which this disclosure is based may readily be utilized as a basis for the designing of other structures, methods and systems for carrying out the several purposes of the instant invention. It is important, therefore, that the claims be regarded as including such equivalent constructions insofar as they do not depart from the spirit and scope of the instant invention.

Further, the purpose of the instant abstract is to enable the U.S. Patent and Trademark office and the public generally, and especially the scientists, engineers and practitioners in the art who are not familiar with patent or legal terms or phraseology, to determine quickly from a cursory inspection of it, the technical disclosure of the patent application. The abstract is neither intended to define the invention of the instant patent application, which is measured by the claims, nor is it intended in any manner to be limiting as to the scope of the instant invention.

Accordingly, the invention provides various objects and advantages including a conspicuous easily locatable device storing and keeping at least One (1) RC unit in an organized, neat, and easily accessible manner. At the same time, the invention also provides a way to store and keep at least One (1) television program guide associated with such RC unit, in the same manner. Still further at the same time, a mode for presenting advertising indicia to the viewer, is provided.

In light of the foregoing, it is therefore an object of the instant invention to provide a new and improved compact portable television channel selection station which has all of the advantages of the prior art and none of its disadvantages.

It is another object of the instant invention to provide a new and improved compact portable television channel selection station which may be easily and efficiently manufactured and marketed.

It is another object of the instant invention to provide a new and improved compact portable television channel selection station which is of a durable and reliable construction.

It is another object of the instant invention to provide a new and improved compact portable television channel selection station which can be manufactured at low cost with regard to both labor and materials, and which accordingly can be sold at a low cost or given as a promotional advertisement gift to members of the consuming public, thus promoting commerce.

It is a further object of the instant invention to provide a new and improved compact portable television channel selection station which provides at least some of the advantages of the prior art schemes, while simultaneously eliminating at least some of the disadvantages of them.

It is a further object of the instant invention to provide a new and improved compact portable television channel selection station which is particularly designed for accommodating stereo and television remote control (RC) devises.

It is an object of the instant invention to provide a portable television channel selection station which, although portable, is sufficiently conspicuous so as to not be easily misplaced.

It is a further object of the instant invention to provide a portable television channel selection station which can be used as a low cost advertisement promotional gift.

It is a further object of the instant invention to provide a portable television channel selection station which can be used as a low cost method of presenting a television viewer with printed advertisement indicia.

Other objects, features, and advantages of the instant invention, in its details of construction and arrangement of parts, will be seen from the above, from the following description of the preferred embodiment when considered in light of the drawings and the appended claims.

DETAILED DESCRIPTION OF THE INVENTION

Figure 1:
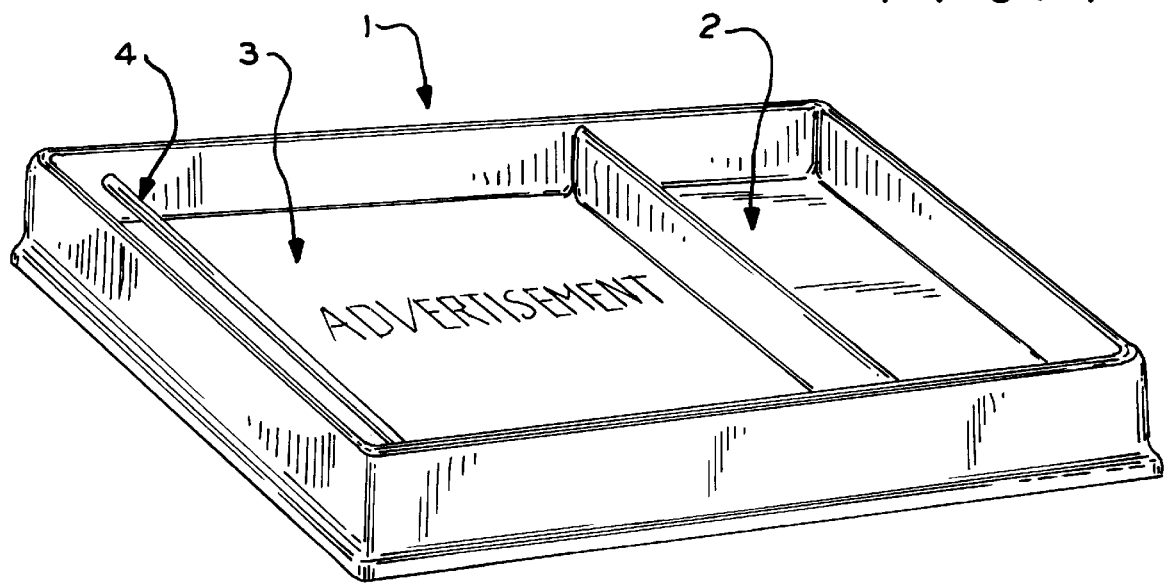
FIG. 1 shows an isometric view of the television channel selection station of the instant invention without a program schedule guide attached to it.
Figure 2:
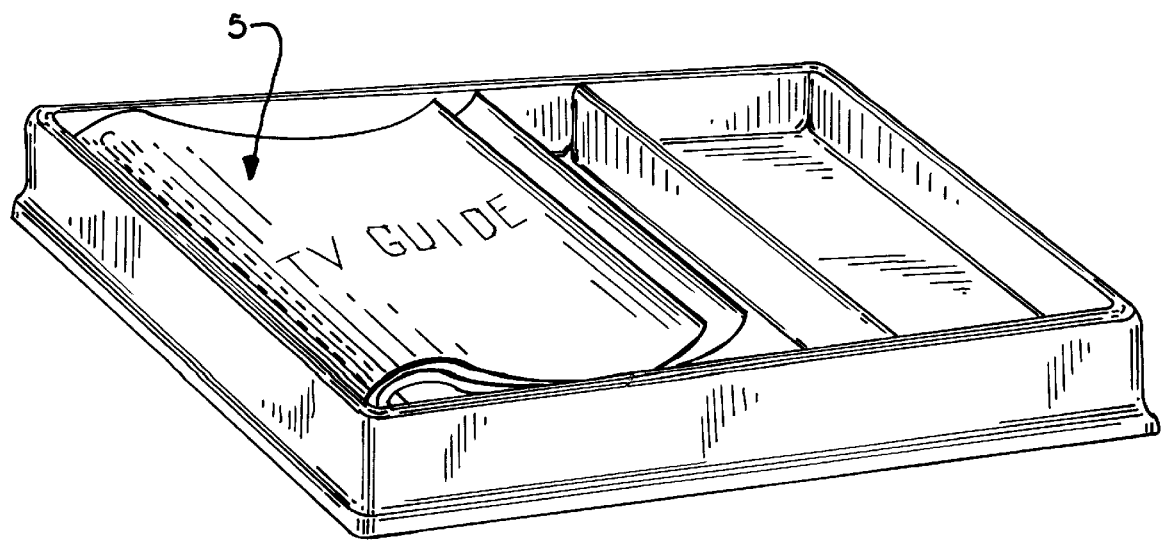
FIG. 2 shows an isometric view of the television channel selection station of the instant invention with a program schedule guide attached to it.

The instant invention provides a television channel selection station (1). The television channel selection station (1) includes a first rectangular well portion (2) generally contoured for cradling a remote control for a television set. Although the first well portion preferably contoured to cradle the shape of a standard RC unit, it can be customized to accommodate substantially any other RC unit of non-standard shape. The television channel selection station (1) also includes a second substantially planar rectangular well portion (3) adjacent and contiguous to the first well portion (2), and dimensioned for cradling a printed television program schedule guide (5) (see, i.e., FIG. 2), preferably of standard size. Here too, as is the case with well portion (2), although standard size is preferred, well portion (3) can be custom fabricated to accommodate substantially a television program schedule guide of substantially any other non-standard size. Finally, television channel selection station (1) includes a substantially straight rigid wire member (4) having a two ends, each mounted in an opposing wall of the second substantially planar rectangular well portion, substantially parallel and opposite to the major dimension of the first rectangular well portion, for engaging the folds of the printed television program schedule guide (5) sufficient to substantially fix it to the television channel selection station (1) as shown in FIG. 2. Although, the wire (4) can be of substantially any suitable material of construction, carbon steel is preferred, both for its functional suitability as well as its low cost.

The instant invention also contemplates a process for manufacturing the foregoing television channel selection station (1). It preferably includes the steps of press or compression molding a substantially rectangular, planar sheet of plastic to substantially form the station (1). Typical equipment used for this step typically comprises a hydraulic or mechanically operated press with platens containing a mold having a plunger and a die. Although press or compression molding is preferred, any other conventional process which can produce a suitable station blank, can be employed in the instant invention.

After the station blank is press molded, it is finished by removing all excess plastic and smoothing all sharp edges. After the finishing process, a substantially straight rigid wire member (4) is positioned and mounted in the substantially formed station sufficient for engaging the folds of a printed television program schedule guide (5) and to substantially fix it to the finished television channel selection station (1). The station (1) of the instant invention can be constructed of substantially any type of moldable plastic. However, non-virgin and/or recycled plastics are adequate and thus, are preferred for reasons of cost.

The preferred method of manufacture is hot stamp pressing. Typically in such a process, a blank is machined from the sheet of plastic to a predetermined precompensated size larger than desired to accommodate normalizing shrinkage. Typically, the blank is normalized by heating the blank in a vacuum oven. The vacuum is released from the oven by introducing dry nitrogen. A stamping die is provided. An embossing surface of the stamping die is contoured as a physical negative of the instant station and bears a physical negative of the desired surface structure of the station. The embossing surface of the stamping die is forced into engagement with the surface of the blank at a predetermined stamping pressure and for a predetermined stamping dwell time. Sufficient heat or ultrasonic energy is applied to the station generation area of the blank to provide the desired station. The embossing surface of the stamping die is removed from the station following the expiration of the stamping dwell time. The station is then removed and excess plastic is removed. As noted above, the desired printed indicia is thereafter applied by any conventional method. Decaled indicia is preferred when cost is the limiting consideration. Where cost is overridden by the desire for esthetics, silk-screening is preferred.

As an alternative but more expensive method of production for forming a somewhat more decorative station, when a plastic is selected as the material of construction, a method can be employed for producing a molded station in a predetermined spatial, non-laminate configuration. This method involves feeding the plurality of respectively dissimilar fluid components, mutually separated, into the molded article-forming structure, which contains a plate flow distributor and a non-fiber-forming shaping section. The flow distributor is made up of at least one distribution plate which is preferably thin and has micromachined on at least one facial surface of it, multiple distribution flow paths having a flow pattern effective to distribute and combine the plurality of components in the predetermined spatial, non-laminate configuration. The mutually separated components are directed through the multiple distribution flow paths sufficient to distribute and arrange the components to form a fluid structure containing the plurality of components in the predetermined spatial, non-laminate configuration. The fluid structure is then subjected to a non-fiber-forming shaping process in the shaping section to form the molded station from it.

Although the invention has been described with reference to certain preferred embodiments, it will be appreciated that many variations and modifications may be made within the scope of the broad principles of the invention. Hence, it is intended that the preferred embodiments and all of such variations and modifications be included within the scope and spirit of the invention, as defined by the following claims.

I claim:

1. A generally rectangular article of manufacture comprising: a first rectangular well portion generally contoured for cradling a remote control for a television set; a second substantially planar rectangular well portion adjacent and contiguous to said first well portion dimensioned for cradling a printed television program schedule guide; and two ends having a substantially straight rigid wire member, each mounted in an opposing wall of said second substantially planar rectangular well portion, substantially parallel and opposite to the major dimension of said first rectangular well portion, for engaging the folds of said printed television program schedule guide sufficient to substantially fix it to said article of manufacture.

2. The article of manufacture of claim 1, wherein said article is compression molded from a flat sheet of non-virgin plastic.

3. The article of manufacture of claim 1, wherein said second substantially planar rectangular well portion further comprises advertisement indicia printed on the substantially planar portion thereof.

4. The article of manufacture of claim 1, wherein said substantially straight rigid wire member is constructed of carbon steel.

5. A portable television channel selection station comprising:

a first rectangular well portion generally contoured for cradling a remote control for a television set;

a second substantially planar rectangular well portion adjacent and contiguous to said first well portion dimensioned for cradling a printed television program schedule guide; and, a substantially straight rigid wire member having a two ends, each mounted in an opposing wall of said second substantially planar rectangular well portion, substantially parallel and opposite to the major dimension of said first rectangular well portion, for engaging the folds of said printed television program schedule guide sufficient to substantially fix it to said television channel selection station.

6. The station of claim 5, wherein said station is compression molded from a flat sheet of non-virgin plastic.

7. The station of claim 5, wherein said second substantially planar rectangular well portion further comprises advertisement inditia printed on the substantially planar portion thereof.

8. The station of claim 5, wherein said substantially straight rigid wire member is constructed of carbon steel.

9. A product by the process of:

compression molding a substantially rectangular, planar sheet of non-virgin plastic to form an article which includes a first rectangular well portion generally contoured for cradling a remote control for a television set and a second substantially planar rectangular well portion adjacent and contiguous to said first well portion dimensioned for cradling a printed television program schedule guide; and, mounting a substantially straight rigid wire member having a two ends, each in opposing wall of said second substantially planar rectangular well portion, substantially parallel and opposite to the major dimension of said first rectangular well portion, for engaging the folds of a printed television program schedule guide sufficient to substantially fix it to said article.

* * * * *